US012508697B2

(12) United States Patent
Shao

(10) Patent No.: US 12,508,697 B2
(45) Date of Patent: Dec. 30, 2025

(54) TORQUE SCREWDRIVER

(71) Applicants: Liang Hua, Hangzhou (CN); Linwei Xue, Hangzhou (CN)

(72) Inventor: Jun Shao, Huangshan (CN)

(73) Assignees: Jun Shao, Huangshan (CN); Liang Hua, Hangzhou (CN); Linwei Xue, Hangzhou (CN)

(*) Notice: Subject to any disclaimer, the term of this patent is extended or adjusted under 35 U.S.C. 154(b) by 0 days.

(21) Appl. No.: 18/792,522

(22) Filed: Aug. 1, 2024

(65) Prior Publication Data

US 2024/0383113 A1 Nov. 21, 2024

(30) Foreign Application Priority Data

Jul. 26, 2024 (CN) ........................ 202421805503.1

(51) Int. Cl.
*B25B 23/14* (2006.01)
*B25B 15/02* (2006.01)

(52) U.S. Cl.
CPC ............ *B25B 23/141* (2013.01); *B25B 15/02* (2013.01)

(58) Field of Classification Search
CPC . B25B 23/0021; B25B 23/0042; B25B 23/14; B25B 23/141; B25B 23/142; B25B 23/1422; B25B 23/1427; B25B 15/00; B25B 15/02; B25B 15/06; B25B 17/00
See application file for complete search history.

(56) References Cited

U.S. PATENT DOCUMENTS 2,884,103 A * 4/1959 Connell ................ B25B 23/141 81/475
2,933,959 A * 4/1960 Mcmahon ........... B25B 23/1427 81/474
3,001,430 A * 9/1961 Cranford ............. B25B 23/1427 81/474
4,774,864 A * 10/1988 Dossier ................... F16D 7/022 81/476
4,901,610 A * 2/1990 Larson ................ B25B 23/1427 81/473
5,239,875 A * 8/1993 Stasiek ................. B25B 23/141 81/474
7,222,559 B2 * 5/2007 Wang .................. B25B 23/1427 81/475
8,714,056 B2 * 5/2014 Landowski ........... F16D 43/206 81/474

(Continued)

FOREIGN PATENT DOCUMENTS

CN 116460783 * 7/2023
CN 214818181 * 7/2023

*Primary Examiner* — Robert J Scruggs

(57) ABSTRACT

The present disclosure relates to the technical field of screwdrivers. Specifically, the torque screwdriver includes a screwdriver handle and an auxiliary scale ring; a screw rod is arranged inside the screwdriver handle; a bearing is arranged on a side surface of the screw rod; a main scale pipe is connected to an outer side of the bearing; an outer side of the main scale pipe is connected with the auxiliary scale ring; and a nut is arranged on an outer side of the auxiliary scale ring. During use of the device, when the screwdriver reaches a fixed torque, the device will slip if the device is continued to be rotated, so as to protect a screw and avoid the screw from being damaged.

3 Claims, 4 Drawing Sheets

(56) References Cited

U.S. PATENT DOCUMENTS

| | | | | |
|---|---|---|---|---|
| 2015/0122091 | A1* | 5/2015 | Chen | B25B 15/02 81/475 |
| 2016/0229036 | A1* | 8/2016 | Marchant | B25B 15/04 |
| 2016/0271772 | A1 | 9/2016 | Knaust et al. | |
| 2018/0065231 | A1 | 3/2018 | Wang | |
| 2021/0213590 | A1 | 7/2021 | Nelson et al. | |

* cited by examiner

TORQUE SCREWDRIVER

TECHNICAL FIELD

The present disclosure relates to the technical field of screwdrivers, and in particular, to a torque screwdriver.

BACKGROUND

A screwdriver can be embedded in a screw, making it easier to drive the screw to rotate. However, a torque of a general screwdriver cannot be set during rotation. Thus, during rotation, a thread of a screw will be damaged if a high force is applied to the screw. It is not conductive to use of the screwdriver.

SUMMARY

The present disclosure aims to provide a torque screwdriver, so as to solve the problems mentioned in the background section.

A torque screwdriver includes a screwdriver handle and an auxiliary scale ring, wherein a screw rod is arranged inside the screwdriver handle; a bearing is arranged on a side surface of the screw rod; a main scale pipe is connected to an outer side of the bearing; an outer side of the main scale pipe is connected with the auxiliary scale ring; and a nut is arranged on an outer side of the auxiliary scale ring.

Preferably a second spring is arranged on a side surface of one end, located outside the screwdriver handle, of the screw rod; an adjustment ring is arranged on a side surface of the second spring; and the main scale pipe is mounted in the adjustment ring in an embedded manner.

Preferably, a square insert is arranged at a tail end in the screwdriver handle; an M5 grub screw is arranged on a side surface of the square insert; a gasket is arranged on a side surface of the M5 grub screw; and a first spring is arranged on a side surface of the gasket.

Preferably, a third steel ball is arranged on a side surface of the first spring; a second steel ball is arranged on a side surface of the third steel ball; the second steel ball and the third steel ball are mounted in the screw rod in an embedded manner; and a hollow wheel is arranged on an outer side of the screw rod.

Preferably, a first steel ball is arranged on an outer side of the main scale pipe, and a second spring is arranged on an outer side of the first steel ball.

Beneficial Effects of the Present Disclosure are as Follows

1. During use of the device, when the screwdriver reaches a fixed torque, the device will slip if the device is continued to be rotated, so as to protect a screw and avoid the screw from being damaged.

BRIEF DESCRIPTION OF THE DRAWINGS

The accompanying drawings are intended to provide a further understanding of the present disclosure and constitute a part of this specification. The accompanying drawings and the embodiments of the present disclosure are used together for explaining the present disclosure rather than constituting a limitation on the present disclosure. In the drawings.

Figure 1:
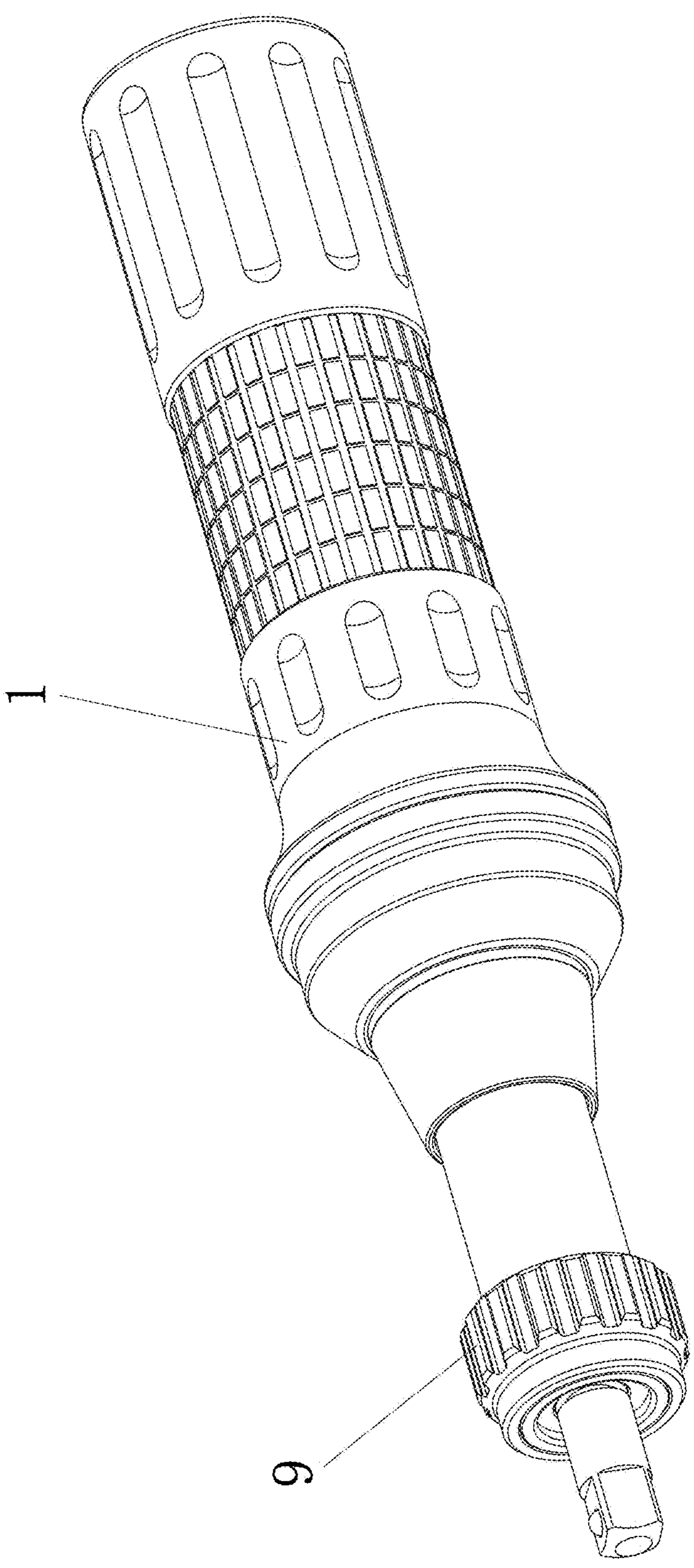
FIG. 1 is a schematic diagram of an entire three-dimensional structure of the present disclosure.

In the drawings: 1: screwdriver handle; 2: square insert; 3: hollow wheel; 4: gasket; 5: screw rod; 50: accommodation space; 6: main scale pipe; 60: groove; 7: nut; 8: auxiliary scale ring; 9: adjustment ring; 10: first spring; 11: first steel ball; 12: second spring; 13: second steel ball; 14: M5 grub screw; 15: bearing; 16: third steel ball; and 17: third spring.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely some embodiments of the present disclosure, rather than all of the embodiments. All other embodiments obtained by a person of ordinary skill in the art based on the embodiments of the present disclosure without making creative efforts shall fall within the protection scope of the present disclosure.

Figure 2:
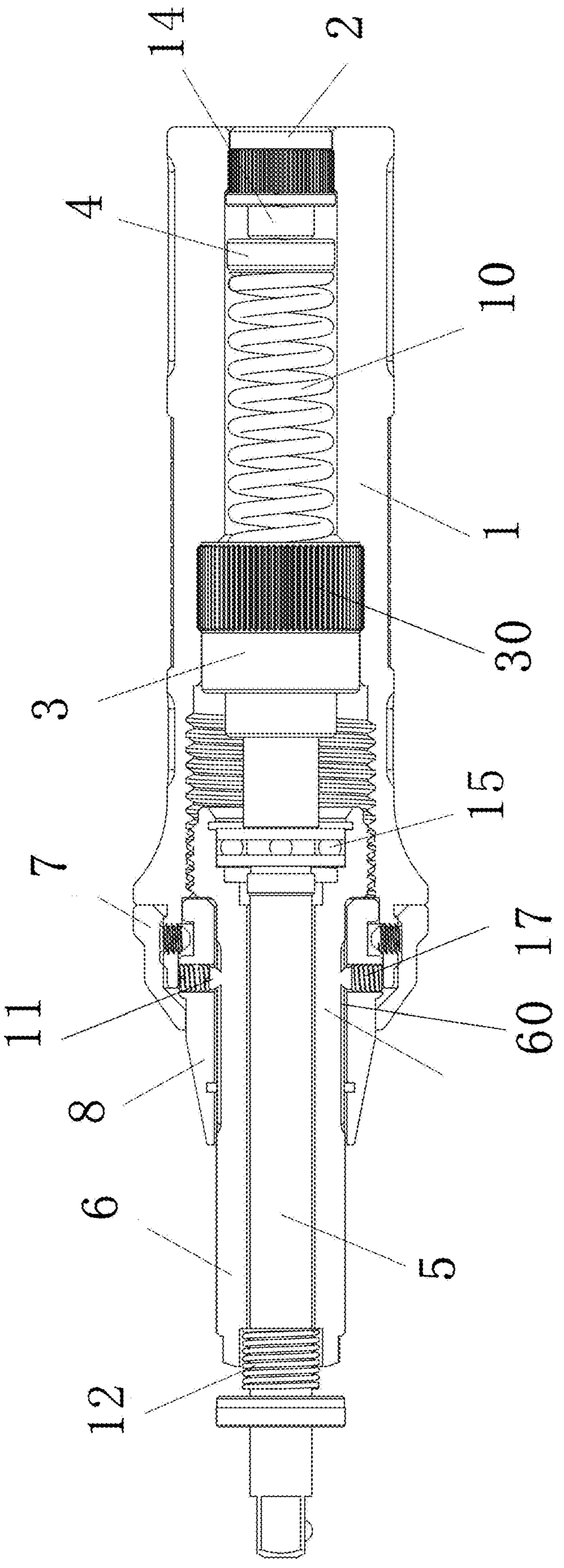
FIG. 2 is a schematic structural diagram of an entire front-sectional view of the present disclosure.
Figure 3:
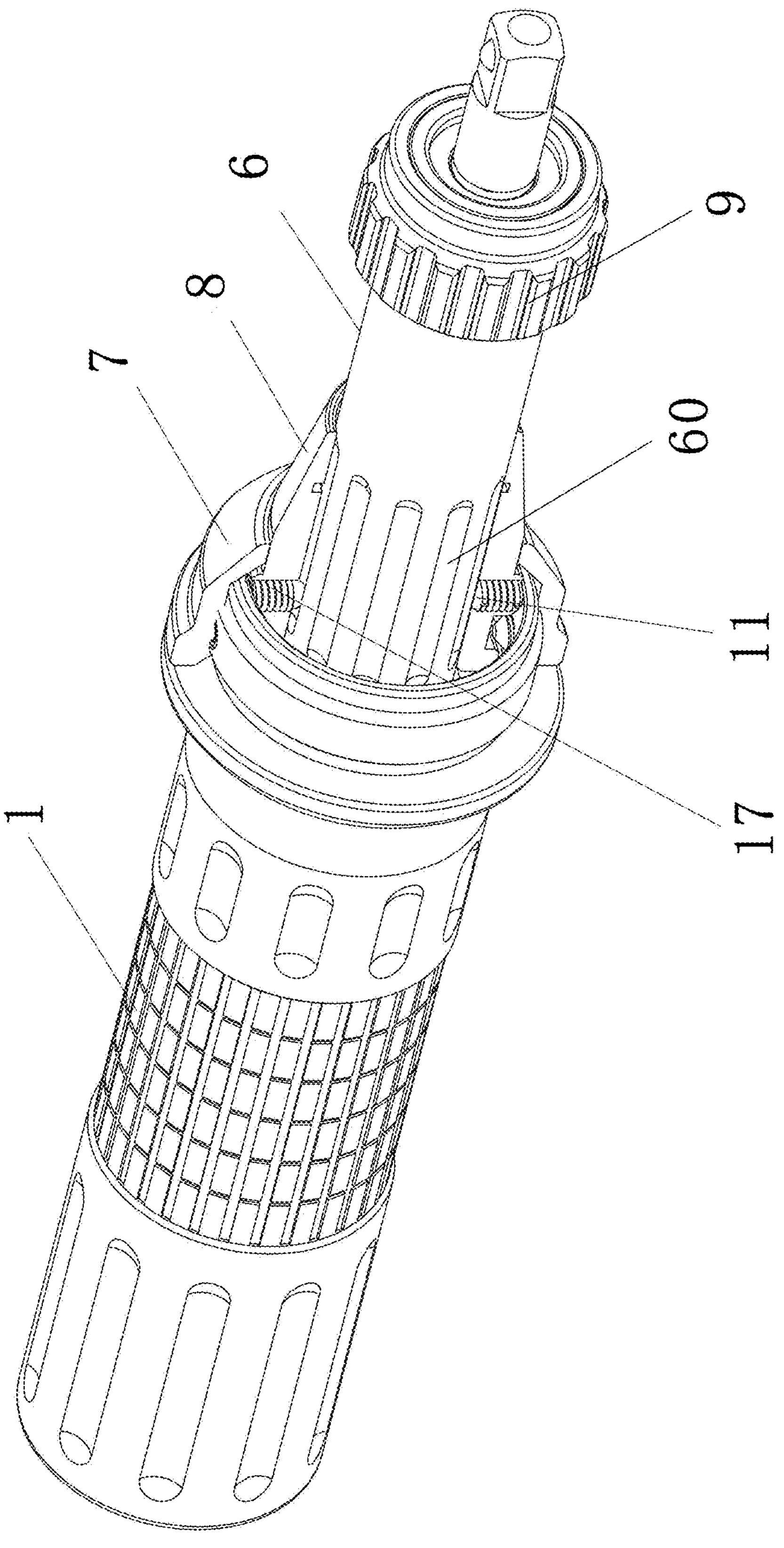
FIG. 3 is a schematic structural diagram of mounting of a screwdriver handle and a main scale pipe of the present disclosure.
Figure 4:
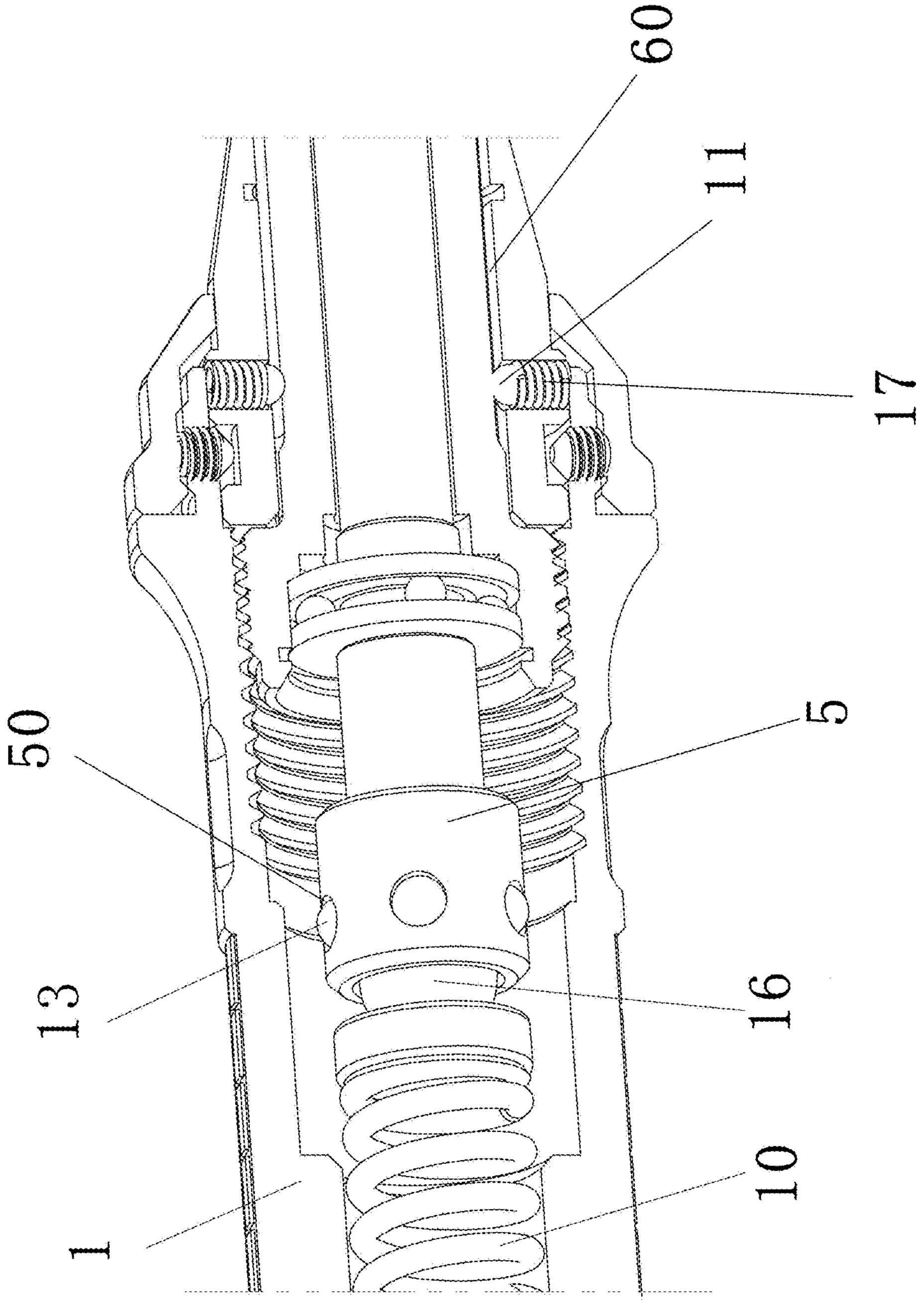
FIG. 4 is a schematic structural diagram of mounting of a first spring and a screwdriver handle of the present disclosure.

During specific implementation, as shown in FIG. 1 to FIG. 4, a torque screwdriver includes a screwdriver handle 1 and an auxiliary scale ring 8, wherein a screw rod 5 is arranged inside the screwdriver handle 1; a bearing 15 is mounted on the screw rod 5; a main scale pipe 6 is mounted on an outer side of the bearing 15; an outer side of the main scale pipe 6 is connected with the auxiliary scale ring 8; and a nut 7 is arranged on an outer side of the auxiliary scale ring.

A second spring 12 is arranged on a side surface of one end, located outside the screwdriver handle 1, of the screw rod 5; an adjustment ring 9 is arranged on a side surface of the second spring 12; and the main scale pipe 6 is mounted in the adjustment ring in an embedded manner.

A square insert 2 is arranged at a tail end in the screwdriver handle 1; an M5 grub screw 14 is arranged on a side surface of the square insert 2; a gasket 4 is arranged on a side surface of the M5 grub screw 14; and a first spring 10 is arranged on a side surface of the gasket 4.

A third steel ball 16 is arranged on a side surface of the first spring 10; five second steel balls 13 are arranged on a side surface of the third steel ball 16; the second steel balls 13 and the third steel ball 16 are mounted in the screw rod 5 and a hollow wheel 3 is arranged on an outer side of the screw rod 5.

Two first steel balls 11 are arranged on an outer side of the main scale pipe 6, and a third spring 17 is arranged on an outer side of each first steel ball 11 and is connected with an inner wall of the screwdriver handle 1. A plurality of grooves 60 are defined at interval on an outer surface of the main scale pipe 6 and each first steel ball 11 abuts against corresponding one of the grooves 60.

Working Principle:

A specific torque value can be set for the torque screwdriver 1 to tighten a screw with a precise torque and prevent the screw from being damaged.

The adjustment ring 9 is pulled in a direction towards the square insert 2 to perform axial rotation when it is required to set a torque for the torque screwdriver. Anticlockwise rotation increases the torque and clockwise rotation decreases the torque. By rotating a preload adjustment device, namely the adjustment ring 9, the main scale pipe 6, and the auxiliary scale ring 8, the screw rod 5 is axially displaced, i.e., moved toward the screwdriver handle 1, thereby transmitting the force from screw rod 5 to the third steel ball 16, so as to compress the first spring 10. It should be understood that the preset torque value correspond to and is positively correlated with the elastic force of the first spring 10. The reset torque is set, i.e., the first spring 10 is compressed, after the rotational adjustment is completed, During the gradual release od the reset torque, i.e., the torque screwdriver being operated to screw a workpiece, the first spring 10 progressively returns form its compressed state to its undeformed state. Once the first spring 10 is subjected to tension of no longer provides support to the third steel ball 16, causing the third steel ball 16 to move along an axial direction of the screw rod 5 towards the square insert 2 and the second steel ball 13 to disengage with the inner sidewall of the hollow wheel 3, the preset torque is fully released. The specific process is as follows:

The adjustment ring 9 drives the main scale pipe 6 to rotate, and a fixed end of the screw rod 5 is designed with the bearing 15, making the rotation easier.

In a rotation process, the main scale pipe 6 compress the internal spring 12. Laser torque scales are provided on the main scale pipe 6. Auxiliary scales are provided on the auxiliary scale ring 8 to finely adjust the torque.

The first spring 10 is provided with the specific gasket 4 at a front end. One end of the gasket 4 is in contact with the first spring 10, and the other end is in contact with the third steel ball 16.

When the torque delivered by the screwdriver has not yet reached the preset torque, the third steel ball 16, connected to the first spring 10, is pressed by the force exerted by the compressed first spring 10 and moved through the hollow wheel 3 along the axial direction of the screw rod 5 away from the square insert 2. The third steel ball 16 presses against a plurality of second steel balls 13 arranged circumferentially along the cylindrical surface of the screw rod 5. The second steel balls 13 move radially outward along the screw rod's cylindrical surface, engaging with the inner sidewall of the hollow wheel 3. This allows the preset torque to be transmitted along the screwdriver i.e., from the handle to the output shaft at the front end, enabling rotation of the work piece.

Conversely, once the torque delivered by the screwdriver reaches the preset torque, the first spring 10 has either returned to its undeformed state of entered a stretched state. At this point, the third steel ball 16, due to sufficient elastic tension or loss of compression/support from the first spring 10, moves along the axial direction of the screw rod 5 towards the square insert 2. As a result, the second steel balls 13, no longer supported or pressed by the third steel ball 16, move toward the axis of the screw rod 5. Thus, the second steel balls 13 disengage from the inner sidewall of the hollow wheel 3, and any further torque applied at the handle can no longer be transmitted through the screw rod 5 to the output end of the screwdriver.

After the screwdriver reaches the set torque value, the screwdriver performs a disengagement action to protect the screw.

It should be noted that in this document, relationship terms such as first and second are used solely to distinguish one entity or operation from another entity or operation without necessarily requiring or implying any actual such relationship or order between such entities or operations. Furthermore, the terms "include", "including", or any other variation thereof, are intended to encompass a non-exclusive inclusion, such that a process, method, article, or device that includes a list of elements does not include only those elements but may include other elements not explicitly listed or inherent to such process, method, article, or device.

It should be finally noted that: The foregoing embodiments are merely preferred embodiments of the present disclosure, but not intended to limit the present disclosure. Although the present disclosure is described in detail with reference to the foregoing embodiments, a person of ordinary skill in the art may still make modifications to the technical solutions described in the foregoing respective embodiments or make equivalent replacements to partial technical features thereof. Any modification, equivalent replacement, and improvement made within the spirit and scope of the present disclosure shall fall within the protection scope of the present disclosure.

What is claimed is:

1. A torque screwdriver, comprising a screwdriver handle (1) and an auxiliary scale ring (8), wherein a screw rod (5) is arranged inside the screwdriver handle (1), a bearing (15) is mounted on the screw rod (5), a main scale pipe (6) is mounted on an outer side of the bearing (15), an outer side of the main scale pipe (6) is connected with the auxiliary scale ring (8), and a nut (7) is arranged on an outer side of the auxiliary scale ring (8);

wherein a square insert (2) is arranged at a tail end in the screwdriver handle (1); a grub screw (14) is arranged on a side of the square insert (2); a gasket (4) is arranged on a side of the grub screw (14); and a first spring (10) is arranged on a side of the gasket (4);

an end of the screw rod (5) proximal to the screwdriver handle (1) is provided with an accommodating space (50) configured to receive a second steel ball (13) and a third steel ball (16), the third steel ball (16) is arranged on a side of the first spring (10), the second steel ball (13) is is arranged on an outer side of the screw rod (5);

upon compression of the first spring (10), compression of the first spring (10) causes the third steel ball (16) to be displaced into the accommodating space (50) in a direction away from the square insert (2), wherein the third steel ball (16) is positioned to press against the second steel ball (13), thereby forcing the second steel ball (13) to engage with an inner sidewall of the hollow wheel (3) so as to establish a torque transmission path from the hollow wheel (3) to the screw rod (5); and upon decompression of the first spring (10), the first spring (10) is tensioned or undeformed and fails to support the third steel ball (16), causing the third steel ball (16) to move along an axial direction of the screw rod (5) towards the square insert (2), whereby the second steel ball (13) disengages from the inner sidewall of the hollow wheel (3) so as to interrupt the torque transmission path from the hollow wheel (3) to the screw rod (5).

2. The torque screwdriver according to claim 1, wherein a second spring (12) is arranged on a side of one end, located outside the screwdriver handle (1), of the screw rod (5); an adjustment ring (9) is arranged on a side of the second spring (12), and the main scale pipe (6) is mounted in the adjustment ring (9) in an embedded manner.

3. The torque screwdriver according to claim 1, wherein a first steel ball (11) is arranged on an outer side of the main scale pipe (6), and a second spring (12) is arranged on an outer side of the first steel ball (11).

* * * * *